United States Patent [19]

Gillbrand et al.

[11] Patent Number: 5,460,784

[45] Date of Patent: * Oct. 24, 1995

[54] DEVICE FOR SUPPLYING EXTRA AIR IN EXHAUST GASES FROM A SUPERCHARGED OTTO ENGINE FITTED WITH A CATALYTIC CONVERTER

[75] Inventors: Per Gillbrand, Mariefred; Per-Inge Larsson, Vagnhärad, both of Sweden

[73] Assignee: Saab Automobile Aktiebolag, Sweden

[ * ] Notice: The portion of the term of this patent subsequent to Oct. 17, 2012, has been disclaimed.

[21] Appl. No.: 178,293

[22] PCT Filed: Jul. 3, 1992

[86] PCT No.: PCT/SE92/00501

§ 371 Date: Jan. 10, 1994

§ 102(e) Date: Jan. 10, 1994

[87] PCT Pub. No.: WO93/01401

PCT Pub. Date: Jan. 21, 1993

[30] Foreign Application Priority Data

Jul. 8, 1991 [SE] Sweden ................ 9102131

[51] Int. Cl.⁶ ............................................. F01N 3/22
[52] U.S. Cl. .................. 422/168; 422/171; 60/289; 60/284; 60/307; 123/564; 123/559.1
[58] Field of Search ................... 422/168, 171; 60/289, 284, 307; 123/559.1, 564, 339

[56] References Cited

U.S. PATENT DOCUMENTS

| | | | |
|---|---|---|---|
| 4,932,368 | 6/1990 | Abe et al. | 123/559.1 |
| 4,995,347 | 2/1991 | Tate et al. | 123/564 |
| 5,111,787 | 5/1992 | Kondo | 123/339 |
| 5,119,631 | 6/1992 | Kayanuma et al. | 60/289 |
| 5,127,386 | 7/1992 | Sowards | 123/564 |
| 5,133,327 | 7/1992 | Hirosawa et al. | 123/564 |
| 5,150,693 | 9/1992 | Ohnaka et al. | 123/564 |
| 5,190,016 | 3/1993 | Takeda | 123/564 |
| 5,299,423 | 4/1994 | Shiozawa et al. | 123/564 |
| 5,307,783 | 5/1994 | Satoya et al. | 123/564 |

FOREIGN PATENT DOCUMENTS

| | | | |
|---|---|---|---|
| 2802429 | 4/1982 | Germany | F01N 3/22 |
| 3213429 | 9/1984 | Germany | F01N 3/22 |
| 3506235 | 9/1985 | Germany | F01N 3/22 |

OTHER PUBLICATIONS

Abstract of JP 63–18122, publ 1988–01–26 vol. 12, No. 222, M 71.

*Primary Examiner*—Robert J. Warden
*Assistant Examiner*—Hien Tran
*Attorney, Agent, or Firm*—Ostrolenk, Faber, Gerb & Soffen

[57] ABSTRACT

Device for injecting air into an exhaust system fitted with catalytic cleaner for a supercharged Otto engine, in whose intake manifold is incorporated a motor driven air compressor operating with internal compression, giving rise to the supercharging. An air bleeding duct is arranged for adjustable air bleeding from the constriction zone of the air compressor to supply this air as additional air to the catalytic cleaner. This air bleeding duct extends from a point in the constriction zone to a point in the exhaust system upstream from the catalytic cleaner. In an inlet section of the intake manifold, located upstream from the compressor, is installed an electronically controlled device for engine idle control during bleeding of the air via the air bleeding duct.

10 Claims, 2 Drawing Sheets

DEVICE FOR SUPPLYING EXTRA AIR IN EXHAUST GASES FROM A SUPERCHARGED OTTO ENGINE FITTED WITH A CATALYTIC CONVERTER

This invention relates to an apparatus for injecting air into an exhaust system including a catalytic converter for a supercharged Otto engine.

STATE OF THE ART

In recent years increasingly tighter requirements have been imposed on the motor industry, out of environmental considerations, among other things, to develop engines and exhaust systems with such characteristics that the quantities of the substances in the exhaust gases most harmful to the environment can be reduced to much lower values than was previously possible.

Major advances have been made in this effort to achieve cleaner, less harmful vehicle exhaust gases, thanks mainly to the development of engines with more efficient ignition and combustion, combined with exhaust systems fitted with efficient catalytic converters or cleaners (catalytic exhaust cleaners), which reduce the content of harmful components in the exhaust gases. The harmful exhaust components referred to here include mainly carbon monoxide, hydrocarbons and nitrogen oxides, which must be converted by means of the catalytic cleaner to the harmless components carbon dioxide, water and nitrogen, respectively.

To ensure that the catalytic converter operates perfectly, however, the exhaust gases fed into the catalytic converter are required to have a certain minimum temperature and a certain composition.

However, if the exhaust gases contain a certain excess of oxygen, for example, the catalytic material (platinum or rhodium) in the catalytic converter is in most cases only able to bring about efficient combustion of carbon monoxide and hydrocarbons, together with combustible particles, whilst an oxygen deficit will instead result in a reduction in nitrogen oxides. On the other hand, the catalytic converter is obviously also required to provide an effective reduction in all three types of harmful exhaust components mentioned. To ensure that this can be achieved the fuel/air mixture supplied to the engine must be controlled so that an exact stoichiometric mixture is obtained.

The catalytic converter is therefore supplied by an oxygen measuring unit (e.g. lambda probe) in the exhaust pipe and an electronic feedback to the fuel system for continuous fine adjustment of the fuel supply. In this connection the term "lambda" denotes the ratio of the available oxygen to the oxygen required for complete combustion.

Exhaust systems so far developed, with catalytic cleaners, have shown to operate highly satisfactorily as soon as the engine and catalytic converter have reached their intended operating conditions in terms of the operating temperature in particular.

However, when a cold engine, and hence also a cold catalytic converter, is started, particularly in cold weather, a certain time must be allowed for the engine and catalytic converter to reach the intended operating temperature. Before this happens neither the engine nor the catalytic converter are operating under optimum conditions, therefore, which means that there are worse conditions for combustion in the engine and reduced efficiency of the catalytic cleaner in the exhaust system.

In fact the principal exhaust emission for cars with a catalytic exhaust cleaner takes place during the first or the very first minutes after the cold start, i.e. before the engine is operating at lambda =1. The length of this introductory high emission phase should in practice be of the order of 60–100 seconds. A supply of oxidizing additional air to the exhaust gases, particularly during this introductory high emission phase, can therefore drastically reduce the emission of exhaust gases.

After the cold start there is generally no longer any requirement for supplying extra air to the catalytic converter. During certain transient processes (full throttle/full load), a certain fuel enrichment may take place, and air may then be supplied to the exhaust gases for oxidation to a limited extent. However, this effect is very limited and is generally negligible compared with cold start emissions.

In such an initial operating stage, immediately after starting the engine, the latter has not yet reached a stable idling speed, and the fuel/air mixture is not optimum but "rich", i.e. there is an oxygen deficit both in the fuel/air mixture which is supplied to the cylinders for combustion and in the exhaust gases which are supplied to the catalytic cleaner. In this case the engine is not operating at the required lambda value 1 either. Obviously there may also be reasons other than that mentioned above (cold start) why the fuel/air mixture is too rich and/or lambda deviates from the ideal value of 1.

However, the result will be an increased content of harmful substances in the vehicle exhaust gases under these non-ideal operating conditions. In the case of a 4-cylinder, 2 liter engine, for example, the requirement for additional air to the catalytic converter on cold starting may be estimated at approximately 120 liters/min.

One way of tackling the problem of oxygen deficit in the exhaust gases supplied to the catalytic cleaner is to arrange for the supply of extra air in the exhaust duct upstream from the catalytic cleaner. In U.S. Pat. No. 4,406,126, for example, a system is described for such a supply of extra air (secondary air) to an internal combustion engine fitted with an exhaust driven turbocompressor. In this case, however, the turbocompressor is not used but extra air is supplied by using the pulsing exhaust gas flow from exhaust ports not connected to the turbine of the turbocompressor to draw in extra air into the exhaust duct. On the other hand, such an arrangement cannot be used for supercharged engines because of the exhaust gas back pressure.

In a supercharged engine or turbo engine the exhaust gas back pressure is so high that the additional air must have a certain minimum excess pressure to be supplied to the exhaust gases before the catalytic converter. In practice an excess pressure of approximately 0.6 bar is probably required. The catalytic converter quickly reaches its intended operating temperature, particularly if it is provided with electrical preheating (which will probably be a statutory requirement in the future), and for the prepared catalytic converter to be used the oxidizing additional air must be injected into the exhaust system of the engine. In the case of non-supercharged engines (aspirated engines) air can be drawn into the exhaust pipe by means of the exhaust gas flow (compare U.S. Pat. No. 4,406,126). However, this cannot be done in the case of turbocharged engines (with an exhaust driven compressor) or supercharged engines because of the exhaust gas back pressure. Moreover, no compressed air is available from the compressor of a turbo unit when the engine, when being cold started and when idling, is operating under a light load at low speed, when the exhaust gas flow is insufficient to drive the compressor. On the other hand, in the case of engines fitted with a mechanically driven compressor (e.g. driven from the engine through a drive shaft, transmission or belt drive), full air pressure is available even when the engine is idling.

OBJECTIVE OF THE INVENTION

The objective of this invention is therefore to supply compressed air by simple means—in a supercharged Otto engine with a mechanically driven air compressor (with internal compression) in the intake manifold—for use as oxidizing additional air which is supplied to the engine exhaust gases before they reach the catalytic cleaner, enabling the latter to provide efficient exhaust gas cleaning despite the rich fuel/air mixture and/or the lambda value deviating from 1. A further objective of the invention is to provide a design solution which is simpler and operates better than known arrangements, for example those with a two-stage compressor (compare U.S. Pat. No. 4,488,400).

The basic concept of the invention is to use the mechanically driven charge compressor provided for this type of engine, which generates charging air and which may be, for example, a single stage screw compressor, for also supplying the separate additional air required for optimum operation of the catalytic converter.

The foregoing and other objects of the invention are achieved by providing an air bleeding duct having an inlet connected to a bleeding point in the constriction zone of the air compressor and an outlet connected to a supply point in the exhaust system located upstream of the catalytic cleaner so that additional air is supplied from the compressor through the duct to the catalytic cleaner.

The arrangement according to the invention has the major advantage that the existing mechanical supercharger (the compressor) is also used as a compressed air source for the additional air required for optimum operation of the catalytic converter in a rich fuel mixture and/or before the engine is able to operate at lambda =1. The design according to the invention is therefore highly cost effective because the engine does not need to be fitted with a new, extra device for generating the required compressed air. The requirement that the additional air must consist of air at excess pressure is obviously due to the fact that the exhaust gas pressure in the exhaust pipe upstream from the catalytic cleaner is also an excess pressure which must be overcome by the pressure of the additional air for this air to be injected into the exhaust system upstream from the catalytic converter. In certain operating cases extra air (additional air) may also be supplied periodically to the catalytic converter for burning away lead deposits - except during the starting process (compare DE-C-3 213 429).

The use of some of the compressed air flow generated by the compressor for this separate additional air purpose must not, however, be allowed to bring about a reduction in engine speed. Because bleeding compressed air through the air bleeding duct would result in a slightly reduced air pressure in the intake manifold (and hence reduced idling speed), if no compensatory measure has been taken at the same time, the invention also provides for the arrangement of an idle control upstream from the compressor.

In practice it is desirable to ensure the maintenance of a certain minimum excess pressure in the intake manifold, regardless of the bleeding of additional air for the catalytic converter which takes place via the air bleeding duct. The internal compression of the compressor, which is generated along the constriction zone, should therefore be at least 1:1.6– 1:1.8, possibly higher.

The idle control arranged upstream from the compressor, with an electronically controlled device, should preferably provide a situation where the areas on opposite sides of an air throttle arranged in the intake manifold of the compressor are interconnected by a shunt duct passing the air throttle and incorporating a control valve itself controlled by a motor, which is in turn controlled by a control unit which is supplied with control signals from different engine parameter sensors. In practice there may be a temperature sensor on the catalytic cleaner, a speed sensor on the engine, a temperature sensor on the engine and a lambda probe on the exhaust manifold.

For the adjustable air bleeding via the air bleeding duct a controllable valve may be suitably incorporated in the air bleeding duct to bring about the adjustable air bleeding via the duct, which valve is controlled by an associated servomotor connected to an electrical control unit. The motor controlled valve used for this purpose may be a position- or PWM-controlled valve which opens when relevant engine parameters (such as temperature, lambda value and speed) indicate conditions with a rich fuel/air mixture. By "PWM-controlled" valve is meant a valve with pulse width modulated opening/closing. The time of an open-closed cycle is constant in this case, but by varying the open time a reverse variation of the closing time is obtained. For example a longer open time gives a shorter closing time with an unchanged total cycle time.

The motor controlled control valve in the shunt duct passing by the air throttle in the intake manifold therefore provides the idle control which maintains an acceptable engine speed regardless of the air flow discharged via the air bleeding duct to the catalytic converter. A motor controlled control valve suitable for this purpose may be an AIC valve or a rotary slotted valve (for a definition of AIC valve see the explanation below).

BRIEF DESCRIPTION OF THE DRAWINGS

The invention will now be explained and described in greater detail with reference to embodiments shown in the attached drawings.

DESCRIPTION OF EMBODIMENTS

Figure 1:
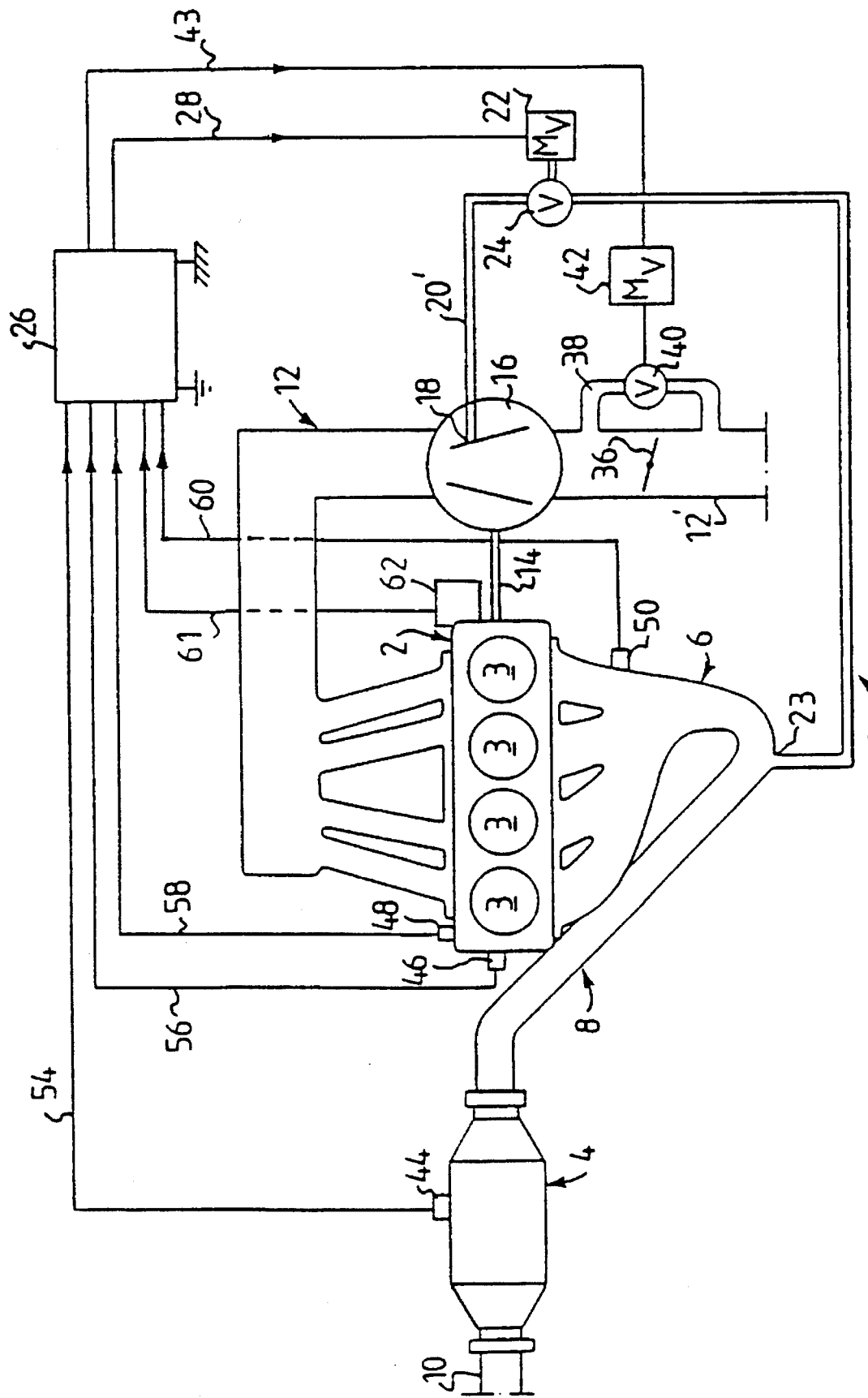
FIG. 1 is a diagrammatic circuit and component diagram for a supercharged Otto engine fitted with a device according to the invention.

In both figures in the drawing a four-cylinder engine is generally denoted by 2, and a catalytic exhaust cleaner incorporated in the engine exhaust system is generally denoted by 4. The exhaust side of the engine is connected to catalytic cleaner 4 by an exhaust manifold 6 and an exhaust port 8. The catalytic cleaner is connected to the ambient atmosphere by an exhaust pipe 10. The combustion air to the engine 2 (which is assumed here to be a fuel injection engine) is supplied to engine cylinders 3 via an intake manifold generally denoted by 12. The upstream section of this intake manifold 12 incorporates a single-stage air compressor 16, which is mechanically driven from engine 2 through a shaft 14, and which brings about the supercharging of the engine. This compressor should preferably be a screw compressor, but other types of compressors are also conceivable. When the compressor is a screw compressor its internal compression may be of the order of 1:1.6–1.8, possibly even higher.

An air bleeding duct, generally denoted by 20, extends from a bleeding point 18, located in the latter part of the constriction zone of compressor 16, to a point 23 at the upstream end of exhaust port 8. A control valve 24, controlled by a servomotor 22, is incorporated in air bleeding duct 20. Valve 24 controls the air flow which is supplied via bleeding duct 20 to catalytic cleaner 4, after having been injected into exhaust port 8 at the point of supply 23. Servomotor 22 is in turn controlled by means of electrical signals received from an electronic control unit 26 via a signal cable 28.

To compensate for the pressure reduction in intake manifold 12 which would result from the bleeding of air through bleeding duct 20 (and which would lead to a reduced idling speed), an electronically controlled idle control device is arranged upstream from compressor 16. This idle controlling compensation device incorporates an air throttle 36 arranged in an inlet section 12' of intake manifold 12 located upstream from compressor 16. The areas before and after air throttle 36 are interconnected via a shunt duct 38, which runs past air throttle 36. The air flow through this shunt duct is controlled by means of a control valve 40 which is itself controlled by a servomotor 42, which is in turn controlled by means of electrical signals received from control unit 26 via control cable 43. Control valve 40 incorporated in shunt duct 38 is ideally an AIC valve/slotted valve which controls an extra air supply to compressor 16 to compensate for the air flow to catalytic converter 4 which is bled via air bleeding duct 20. Due to this flow of air into compressor 16, increased by control valve 40, the desired idling speed of engine 2 can be maintained regardless of the additional air flow discharged to the catalytic converter. The AIC valve performs the dual role firstly of compensating for long-term variations, avoiding idling adjustment, and secondly of compensating for instantaneous idling speed reductions as the load increases.

To enable electronic control unit 26 to control motor 24 of the position- or PWM-controlled valve 24 and motor 42 of control valve 40 the control unit must be supplied with control signals representing the engine parameters relevant in this connection. In the design shown these parameters are firstly the temperature in catalytic cleaner 4, secondly the speed and temperature of engine 2, and thirdly the temperature of the exhaust gases in exhaust manifold 6. These engine parameters are detected by means of a sensor 44 on catalytic converter 4, sensors 46 and 48 on engine 2, and a sensor 50 on exhaust manifold 6. The signals from these four sensors are transmitted to control unit 26 via signal cables 54, 56, 58, 60.

For example, if the operation of the catalytic converter is required to be controlled additional air (extra air) can be supplied instantaneously, and it can then be determined how quickly the catalytic converter reacts by means of a lambda probe in exhaust pipe 10, downstream from catalytic converter 4, or by temperature measurement (sensor 44) on the catalytic converter.

In the arrangement described above the guarantee of a reliable starting function is also required wherever possible. Air bleeding duct 20 is therefore suitably fitted with shutoff mechanisms which prevent the bleeding of air via bleeding point 18 and duct section 20' when the starter motor 62 is operating, i.e. during so-called starter motor cranking. The starter motor 62 is controlled by control unit 26 through a cable 61. The shutoff mechanisms mentioned may suitably be the motor controlled valve 24, whose closing function is then controlled by control unit 26.

With regard to the idle control device with air throttle 36 upstream from compressor 16 it should also be mentioned that it would be theoretically possible to locate throttle 36 after, i.e. downstream from, compressor 16 instead. In this case, however, a waste gate valve would be required to "blow away" the excess compressed air generated by the compressor, because there would then be no throttling, of course, on the suction side of the compressor. The compressor would therefore perform a certain amount of unnecessary work, which is of course not desirable in itself but at the same time provides a faster response to the control, which may be desirable in some cases.

Figure 2:
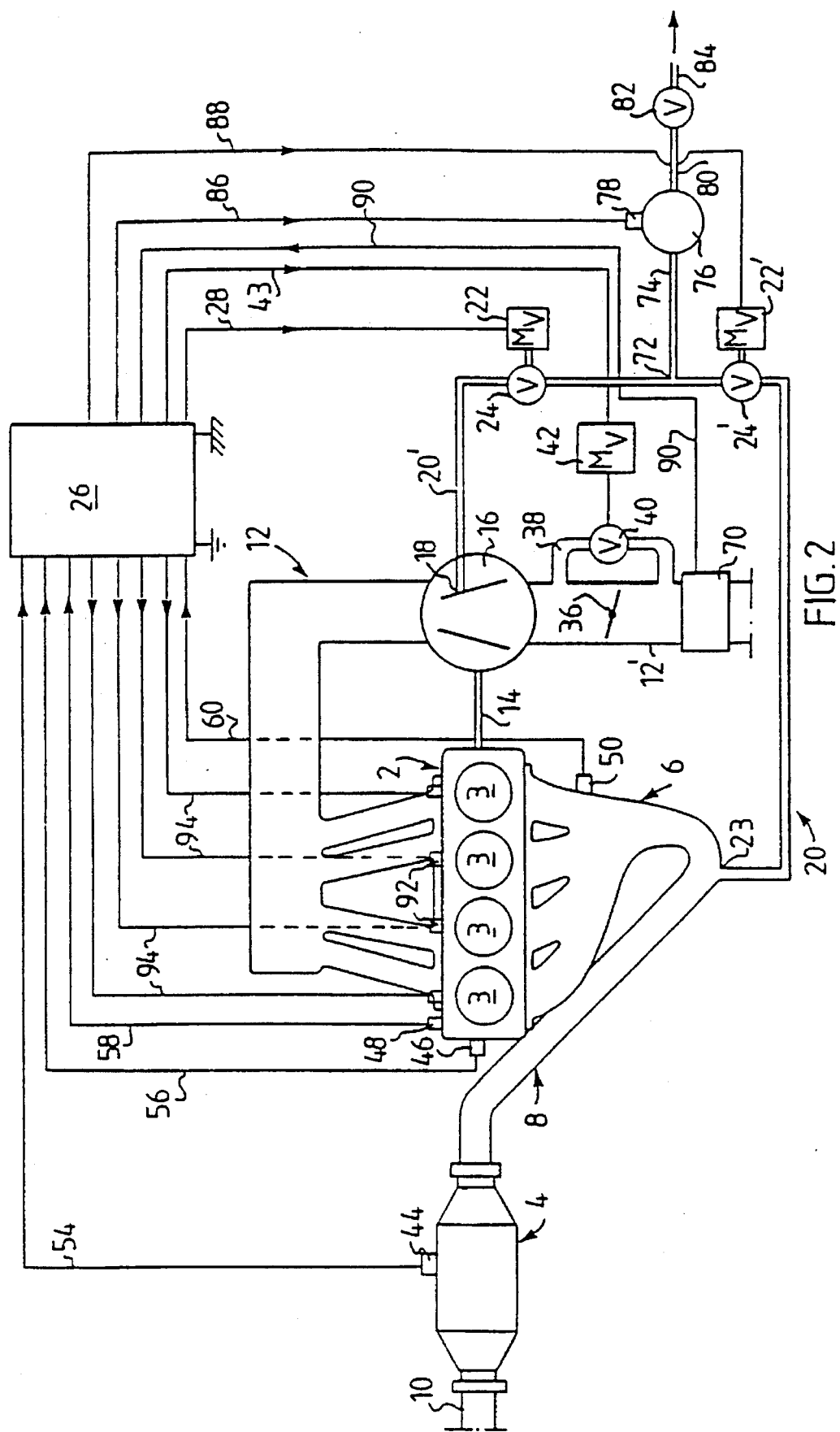
FIG. 2 is a similar diagram for an alternative design with certain additional equipment, among other things an air mass meter in the intake manifold.

Reference is now made to the alternative design shown in FIG. 2, which differs from that shown in FIG. 1 in that certain supplementary equipment has been added. The description below is confined mainly to the added components and parts.

In the design shown in FIG. 2 an air mass meter 70 is arranged in inlet section 12' of intake manifold 12. The air mass meter measures the mass of air which is sucked inthrough inlet section 12' of intake manifold 12 per unit of time. The optimum open time for the fuel injection valves of engine 2, e.g. in the control unit, can be calculated on the basis of the present engine speed (which can be obtained by means of speed sensor 46) and the air mass flow measured by means of air mass meter 70. Air mass meter 70 is connected to control unit 26 by a signal cable 90. The fuel is injected into cylinders 3 of engine 2 via separate fuel injection nozzles 92 (only indicated diagrammatically in FIG. 2), whose operation is controlled from control unit 26 via signal cables 94.

The bleeding of the additional (extra) air to the catalytic converter affects the quantity of air reaching the engine cylinders. Air mass meter 70 located upstream from the compressor measures the total quantity of air which is supplied to compressor 16 and which could be supplied to cylinders 3 and catalytic converter 4. The actual quantity of air which reaches the cylinders—to which the fuel supply must be adapted - can therefore be obtained by correcting the signal from the air mass meter according to the quantity of air bled from compressor 16 at bleeding point 18.

This correction of the flow signal from the air mass meter is suitably carried out in control unit 26, which then takes into consideration the quantity of air bled from the compressor in the form of a parameter corresponding to this quantity of air, e.g. the degree of opening of valve 24 or an output signal received from a particular air mass meter (flow meter) incorporated in duct section 20' between bleeding point 18 and valve 24.

The idle control and air mass measurement provide the following: more constant engine speed, better cold starting and warming up characteristics, increased idling speed when an air-conditioning system is connected, for example, compensation for reduction in engine speed resulting from increased loading (for example, by the power steering pump and generator charging), as well as further characteristics/functions aimed for.

At a point 72 on air bleeding duct 20 located downstream from control valve 24 there is a branch 74 in the form of a bleeding duct which leads to a pressure accumulator 76, from which compressed air, at a controlled flow rate, can be bled via a pipe 80 and control valve 82 for subsequent feeding, via pipe 84, to relevant accessories driven by or consuming compressed air (compare U.S. Pat. No. 3,934, 413), e.g. inflatable door seals, servomotors, air assisted fuel injection etc. Pressure accumulator 76 is also fitted with a pressure sensor 78 whose output signal is transmitted to control unit 26 via a signal cable 86, and an extra control valve 24' is inserted in air bleeding duct 20 downstream from branch point 72. This valve 24' is controlled by means of a motor 22', which is in turn controlled from control unit 26 via a signal cable 88.

We claim:

1. A device for injecting air into an exhaust system of a super charged Otto engine, which device comprises:

a mechanical compressor having internal compression and a constriction zone for providing compressed air to an Otto engine to supercharge the same, the engine having an intake manifold and an exhaust system including a catalytic converter, the compressor being disposed in the intake manifold; and an air bleeding duct having an inlet connected to a bleeding point in the constriction zone and an outlet connected to a supply point in the exhaust system upstream of the catalytic converter to thereby supply air from the compressor to the catalytic converter.

2. A device according to claim 1, including means for adjusting the amount of air supplied from the compressor to the catalytic converter, said adjusting means being disposed in the air bleeding duct.

3. A device according to claim 2, wherein the adjusting means includes a control valve, and further including a servo motor for controlling the valve and an electrical control unit for controlling the servo motor.

4. A device according to claim 2, in which a starter motor is provided for cranking the engine to start the same, the adjusting means includes a control valve, and in which a servo motor for controlling the valve and an electrical control unit for controlling the servo motor are provided for preventing any air flow through the air bleeding duct during operation of the starter motor.

5. A device according to claim 1, wherein the inlet of air bleeding the duct is connected to the constriction zone at a downstream section thereof and wherein the internal compression of the compressor in the constriction zone is at least 1:1.6–1.8.

6. A device according to claim 1, wherein the compressor is a single stage compressor.

7. A device according to claim 1, including means disposed upstream of the compressor for electronically controlling an idle speed of the engine.

8. A device according to claim 7, wherein the idle speed controlling means comprises an air throttle disposed in the intake manifold, a shunt duct having first and second ends, the first end being connected to the intake manifold on one side of the air throttle and a second end connected to the intake manifold on an opposite side of the air throttle, means for sensing the values of a plurality of engine parameters, a control valve disposed in the shunt duct, a motor for controlling the control valve and a control unit for controlling the motor in accordance with the sensed values of the plurality of engine parameters.

9. A device according to claim 8, wherein the parameters are the temperature in the catalytic converter, the speed including the idle speed of the engine, the temperature of the engine and the temperature of exhaust gases in an exhaust manifold of the engine forming part of the exhaust system.

10. A device according to claim 7, wherein an air mass meter for controlling the quantity of fuel injected into the engine is arranged in an inlet section of the intake manifold located upstream from the compressor, the air mass meter being positioned at a point located upstream of the means for controlling idle speed.

* * * * *